(12) United States Patent
Sumida et al.

(10) Patent No.: US 8,696,953 B2
(45) Date of Patent: Apr. 15, 2014

(54) SUPPORT STRUCTURE, NANOFIBER MANUFACTURING APPARATUS USING THE SUPPORT STRUCTURE, AND NANOFIBER MANUFACTURING METHOD USING THE SUPPORT STRUCTURE

(75) Inventors: Hiroto Sumida, Nara (JP); Takahiro Kurokawa, Osaka (JP); Hiroyuki Tsuji, Kyoto (JP); Kazunori Ishikawa, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/821,723

(22) PCT Filed: Sep. 7, 2011

(86) PCT No.: PCT/JP2011/005026
§ 371 (c)(1),
(2), (4) Date: Mar. 8, 2013

(87) PCT Pub. No.: WO2012/032777
PCT Pub. Date: Mar. 15, 2012

(65) Prior Publication Data
US 2013/0168886 A1     Jul. 4, 2013

(30) Foreign Application Priority Data

Sep. 9, 2010   (JP) ................................ 2010-202482
Jan. 28, 2011  (JP) ................................ 2011-017017

(51) Int. Cl.
*D01D 5/00*     (2006.01)
(52) U.S. Cl.
USPC ..................... 264/10; 264/465; 425/174.8 E (58) Field of Classification Search
None
See application file for complete search history.

(56) References Cited

U.S. PATENT DOCUMENTS

2009/0224437 A1     9/2009   Fukuoka et al.

FOREIGN PATENT DOCUMENTS

| JP | 2007-303015 | 11/2007 |
| JP | 2008-174855 | 7/2008 |
| JP | 2009-249795 | 10/2009 |
| WO | 2007/069381 | 6/2007 |

OTHER PUBLICATIONS

English translation of International Preliminary Report on Patentability mailed Mar. 14, 2013 in International (PCT) Application No. PCT/JP2011/005026.
International Search Report (ISR) issued Nov. 8, 2011 in International (PCT) Application No. PCT/JP2011/005026.

*Primary Examiner* — Mary F Theisen
(74) *Attorney, Agent, or Firm* — Wenderoth, Lind & Ponack, L.L.P.

(57) ABSTRACT

A nanofiber manufacturing apparatus for fabricating nanofibers from a raw material liquid by electrostatic explosions includes a housing internally having an electrospinning space in which nanofibers are fabricated, and a support structure for supporting an electrospinning head including nozzles for ejecting the raw material liquid into the electrospinning space. The support structure is fittable to and removable from the housing and is enabled to self-stand in a state of having been removed from the housing.

17 Claims, 7 Drawing Sheets

SUPPORT STRUCTURE, NANOFIBER MANUFACTURING APPARATUS USING THE SUPPORT STRUCTURE, AND NANOFIBER MANUFACTURING METHOD USING THE SUPPORT STRUCTURE

TECHNICAL FIELD

The present invention relates to a support structure, as well as nanofiber manufacturing apparatus and method, for fabricating polymer nanofibers from polymer solution by electrostatic explosions.

Conventionally, there has been known a nanofiber manufacturing apparatus including a collector to which a specified electric potential is applied, and a nozzle which is located at a specified distance from the collector and with which a voltage being a specified electric potential difference (e.g., 20-200 kV) is applied against the collector, where the collector and the nozzle are provided within an electrospinning space in a housing (see, e.g., PTL 1). The nozzle with a voltage applied thereto ejects a nanofiber raw material liquid (polymer solution) toward the collector while electrically charging the raw material liquid. The ejected raw material liquid electrostatically explodes on its way to the collector. This electrostatic explosion occurs repeatedly, by which the raw material liquid is drawn so as to be formed finally into nanofiber. The formed nanofiber is accumulated on a sheet placed on the collector.

CITATION LIST

Patent Literature

PTL1: JP 2008-174855 A

SUMMARY OF INVENTION

Technical Problem

However, the nanofiber manufacturing apparatus is so constructed as to form nanofiber by electrostatic explosions within the electrospinning space in the housing. This causes poorer working efficiency for maintenance of the nanofiber manufacturing apparatus, especially maintenance (e.g., cleaning and replacement) of the nozzle and the like placed within the electrospinning space in the housing, the maintenance needing to be done by the operator entering into the housing while the operator's safety is ensured.

In cases where the nanofiber manufacturing apparatus is larger-scaled to fabricate large amounts of nanofiber, e.g. where the number of nozzles is increased and moreover the housing is larger-scaled, the working efficiency becomes even poorer.

Accordingly, an object of the present invention is to provide a nanofiber manufacturing apparatus which, even though large-scaled, makes it possible to realize safe and yet high-workability maintenance of the apparatus.

Means to Solve the Problems

In order to achieve the above object, the invention has the following constitutions.

According to a first aspect of the invention, there is provided a support structure for supporting an electrospinning head including a nozzle for ejecting a raw material liquid into an electrospinning space in which nanofibers are fabricated, wherein the support structure is fittable to and removable from a housing internally having the electrospinning space and is enabled to self-stand in a state of having been removed from the housing.

According to a second aspect of the invention, there is provided the support structure according to the first aspect, wherein the support structure, while fitted to the housing, isolates the electrospinning space and its outside from each other.

According to a third aspect of the invention, there is provided the support structure according to the first or second aspects, wherein during fitting and removal of the support structure to the housing, a center of gravity of the support structure is positioned on one side closer to the housing.

According to a fourth aspect of the invention, there is provided the support structure according to any one of the first to third aspects, wherein the electrospinning head is made fittable to and removable from the support structure.

According to a fifth aspect of the invention, there is provided a nanofiber manufacturing apparatus for fabricating nanofibers from a raw material liquid by electrostatic explosions, the nanofiber manufacturing apparatus comprising:

a housing internally having an electrospinning space in which nanofibers are fabricated; and a support structure for supporting an electrospinning head including a nozzle for ejecting the raw material liquid into the electrospinning space, wherein the support structure is fittable to and removable from the housing and is enabled to self-stand in a state of having been removed from the housing.

According to a sixth aspect of the invention, there is provided the nanofiber manufacturing apparatus according to the fifth aspect, wherein the housing includes a housing-side power feeding terminal connected to a power supply, and a grounded housing-side grounding terminal, the support structure includes a head driving unit for driving the electrospinning head, a support structure-side power feeding terminal contactable with the housing-side power feeding terminal for feed of electric power to the head driving unit, and a support structure-side grounding terminal contactable with the housing-side grounding terminal for grounding of the support structure, while the support structure is fitted to the housing, the housing-side power feeding terminal and the support structure-side power feeding terminal are in contact with each other and moreover the housing-side grounding terminal and the support structure-side grounding terminal are in contact with each other, and wherein while the support structure has been removed from the housing, the housing-side power feeding terminal and the support structure-side power feeding terminal are disconnected from each other and moreover the housing-side grounding terminal and the support structure-side grounding terminal are disconnected from each other.

According to a seventh aspect of the invention, there is provided the nanofiber manufacturing apparatus according to the sixth aspect, wherein the support structure serves as part of a wall of the housing defining the electrospinning space, the wall of the housing defining the electrospinning head is made from a conductor and moreover an insulating layer is formed inside the wall, and the support structure-side grounding terminal is connected to a conductor portion of the support structure.

According to an eighth aspect of the invention, there is provided the nanofiber manufacturing apparatus according to the sixth or seventh aspects, wherein at least one of the housing-side grounding terminal and the support structure-side grounding terminal is made expandable and contractible with respect to a fitting-and-removal direction of the support structure so that for fitting of the support structure to the housing, the housing-side grounding terminal and the support structure-side grounding terminal are brought into contact with each other before the housing-side power feeding terminal and the support structure-side power feeding terminal are brought into contact with each other, and that for removal of the support structure from the housing, the housing-side grounding terminal and the support structure-side grounding terminal are released from their contact after the housing-side power feeding terminal and the support structure-side power feeding terminal are released from their contact.

According to a ninth aspect of the invention, there is provided the nanofiber manufacturing apparatus according to any one of the sixth to eighth aspects, wherein the head driving unit is fitted to a portion of the support structure which is positioned outside the housing while the support structure is in a state of having been fitted to the housing.

According to a tenth aspect of the invention, there is provided the nanofiber manufacturing apparatus according to any one of the fifth to ninth aspects, further comprising a guide mechanism for guiding the support structure during fitting and removal of the support structure while restricting the fitting-and-removal direction of the support structure to a certain direction.

According to a eleventh aspect of the invention, there is provided a nanofiber manufacturing apparatus for fabricating nanofibers from a raw material liquid by electrostatic explosions, the nanofiber manufacturing apparatus comprising:

a housing internally having an electrospinning space in which nanofibers are fabricated;

a collector placed within the electrospinning space to collect nanofibers; and a support structure for supporting a working head that performs work related to fabrication of nanofibers within the electrospinning space, wherein the support structure is fittable to and removable from the housing and is enabled to self-stand in a state of having been removed from the housing.

According to a twelfth aspect of the invention, there is provided the nanofiber manufacturing apparatus according to the eleventh aspect, wherein the working head is fittable to and removable from the support structure, and as the working head, any one of an electrospinning head including a nozzle for ejecting a raw material liquid into the electrospinning space, an adhesive application head for applying adhesive to a sheet on the collector, and a thermal press-bonding head for thermally press-bonding a sheet on the collector and nanofibers on the sheet to each other is fitted to the support structure.

According to a thirteenth aspect of the invention, there is provided the nanofiber manufacturing apparatus according to the eleventh or twelfth aspects, wherein the housing includes a housing-side power feeding terminal connected to a power supply, and a grounded housing-side grounding terminal, the support structure includes a head driving unit for driving the working head, a support structure-side power feeding terminal contactable with the housing-side power feeding terminal for feed of electric power to the head driving unit, and a support structure-side grounding terminal contactable with the housing-side grounding terminal for grounding of the support structure, while the support structure has been fitted to the housing, the housing-side power feeding terminal and the support structure-side power feeding terminal are in contact with each other and moreover the housing-side grounding terminal and the support structure-side grounding terminal are in contact with each other, and while the support structure has been removed from the housing, the housing-side power feeding terminal and the support structure-side power feeding terminal are disconnected from each other and moreover the housing-side grounding terminal and the support structure-side grounding terminal are disconnected from each other.

According to a fourteenth aspect of the invention, there is provided a nanofiber manufacturing method with use of a support structure for supporting an electrospinning head including a nozzle for ejecting a raw material liquid into an electrospinning space in which nanofibers are fabricated, comprising:

fitting the support structure to a housing internally having the electrospinning space so that the electrospinning head is placed in the electrospinning space;

fabricating nanofiber by electrostatic explosions from the raw material liquid ejected from the nozzle of the electrospinning head; and removing the support structure from the housing after fabrication of nanofiber so that the electrospinning head is taken out outside the housing.

Advantageous Effects of Invention

According to the present invention, since the support structure for supporting the electrospinning head equipped with nozzles is fittable to and removable from the housing internally having the electrospinning space in which nanofibers are fabricated, only removing the support structure from the housing makes it possible to fulfill maintenance of the nozzles outside the electrospinning space. Thus, workability and safety of the maintenance are higher than when it is fulfilled within the electrospinning space. Also, since the support structure is enabled to self-stand, maintenance of the nozzles can be started immediately after the removal of the support structure from the housing.

BRIEF DESCRIPTION OF DRAWINGS

The above aspects and features of the present invention will become more apparent from the following description of preferred embodiments thereof with reference to the accompanying drawings, and wherein.

DESCRIPTION OF EMBODIMENTS

Hereinbelow, embodiments of the present invention will be described with reference to the accompanying drawings.

Figure 1:
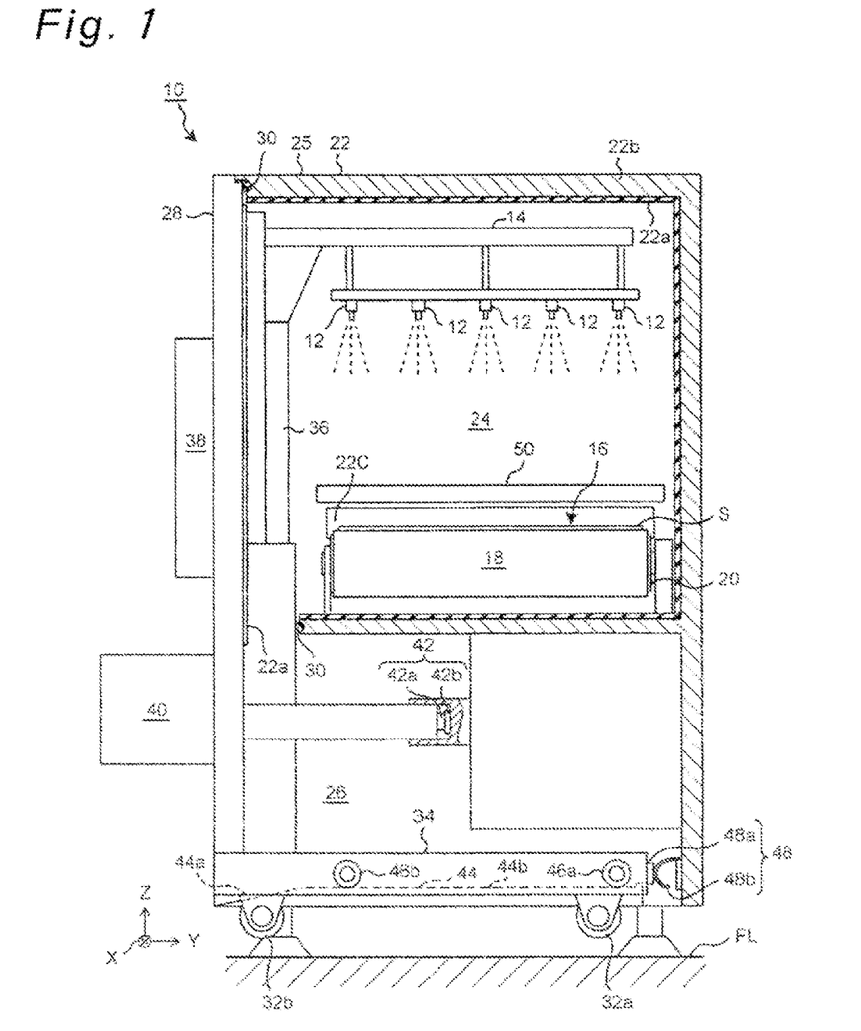
FIG. 1 is a partial sectional view of a nanofiber manufacturing apparatus with a support structure fitted thereto, as viewed in a side view, according to one embodiment of the invention.
Figure 2:
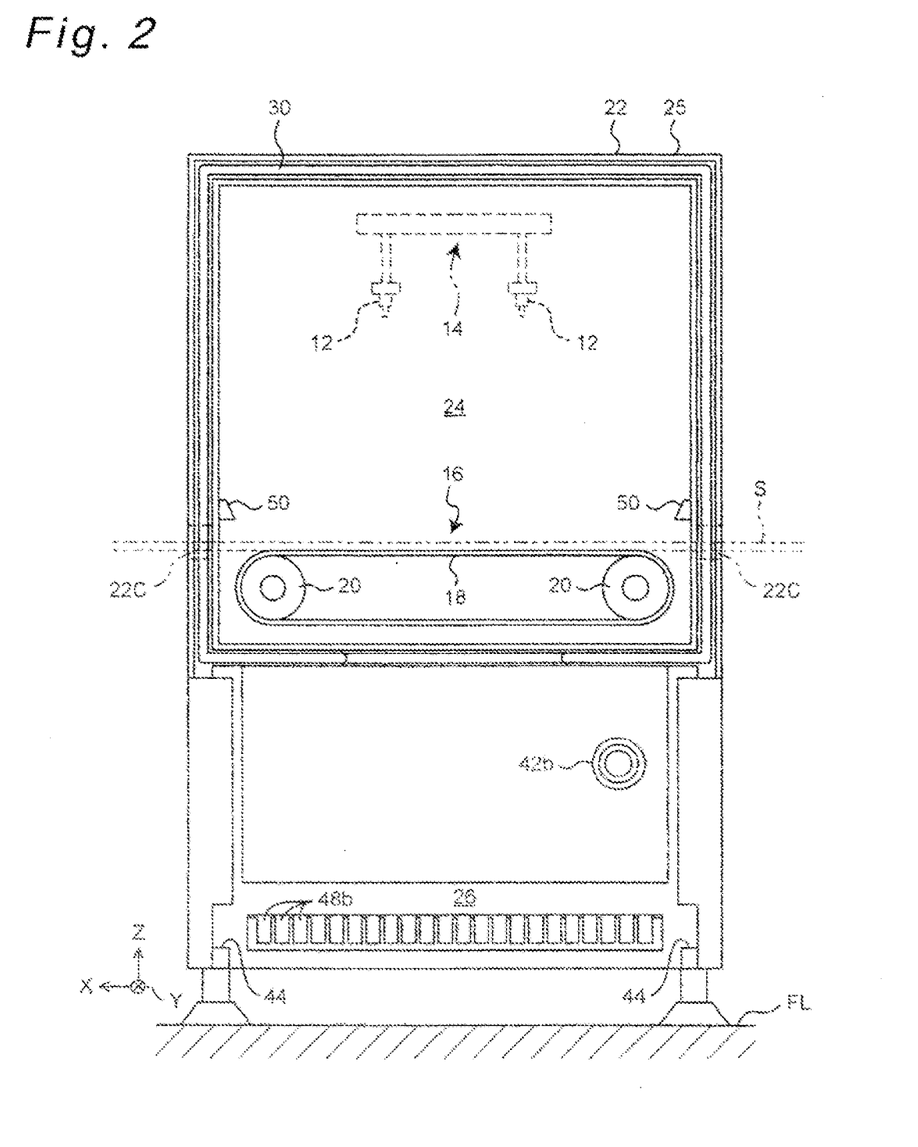
FIG. 2 is a front view of the nanofiber manufacturing apparatus with the support structure removed therefrom according to one embodiment of the invention.

FIG. 1 is a partial sectional view of a nanofiber manufacturing apparatus, as viewed in a side view (in an X-direction view), according to one embodiment of the invention. FIG. 2 is a front view (in a Y-direction view) of the nanofiber manufacturing apparatus shown in FIG. 1. The nanofiber manufacturing apparatus 10 shown in FIGS. 1 and 2, as will be described in detail, is so made up as to be enabled to function as part of a production line of nanofiber sheets (sheets formed by bonding and integrating a multiplicity of nanofibers on a base sheet).

It is noted here that the term 'nanofiber' herein refers to a filamentous substance formed from polymeric materials and having submicronscale or nanoscale diameters. The polymeric material may be various high polymers such as petroleum polymers and biopolymers including polyvinylidene fluoride (PVDF), polyvinylidene fluoride-co-hexafluoropropylene, polyacrylonitrile, polymethyl methacrylate, polyethylene, polypropylene and the like, as well as their copolymers and mixtures or the like. The nanofiber raw material liquid is a solution in which those polymeric materials have been dissolved.

As shown in FIG. 1, the nanofiber manufacturing apparatus 10 includes an electrospinning head 14 having a plurality of nozzles 12, and a collector 16 apart from the electrospinning head 14 to a specified distance (e.g., 100 to 600 mm) in a vertical direction (Z-axis direction). The plurality of nozzles 12 include in the electrospinning head 14 may be provided so as to be fittable and removable to the electrospinning head 14 or to be formed into an integral unit.

The plurality of nozzles 12 of the electrospinning head 14 ejects out a nanofiber raw material liquid toward the collector 16. Also, each of the plurality of nozzles 12 receives application of a voltage that leads to a specified electric potential difference (e.g., 20 to 200 kV) to the electric potential of the collector 16 (a voltage applied to the collector 16). With such nozzles 12, the raw material liquid is ejected out toward the collector 16 while electrically charged.

The collector 16, as shown in FIG. 2, has a belt 18 made from an electroconductive material, and driving rollers 20 made from an electroconductive material and working for driving the belt 18. The collector 16 serves also as a conveyance unit for conveying base sheets S horizontally (in the X-axis direction orthogonal to the Z axis) by the belt 18.

Alternatively, in a case where the base sheet S, being an elongated one as an example, is wound up by a reel (not shown) placed on the upstream side in a moving direction of the base sheet 5, the collector 16 may be so made up that the belt 18 is moved by the driving rollers 20 so as to synchronize with or follow after the moving base sheet S. With this arrangement, contact sliding between the moving base sheet S and the belt 18 can be suppressed, making it possible to reduce sliding resistance occurring between the base sheet S and the belt 18 of the collector 16, which are electrostatically sucked to each other by charged nanofiber layers stacked on the base sheet S during the fabrication of nanofibers. Details of the conveyance of the base sheet S by the belt 18 will be described later.

Although the base sheet S and the belt 18 of the collector 16 are in direct contact with each other in this embodiment, it is also allowable that the base sheet S is conveyed horizontally (in the X-axis direction) by a conveyor belt (not shown) independent of the belt 18 while the belt 18 of the collector 16 is placed to face the base sheet S via the conveyor belt. In this case, since the belt 18 of the collector 16 is moved so as to synchronize with or follow after the conveyor belt, the sliding resistance between the belt 18 and the conveyor belt is reduced.

The driving rollers 20 have a specified voltage (e.g., 10 to 100 kV) applied thereto during the fabrication of nanofibers. This voltage application causes a specified electric potential difference between the belt 18 and the nozzles 12, giving rise to electrostatic explosions, so that nanofibers formed from the raw material liquid by the electrostatic explosions are accumulated on the base sheet S on the belt 18. It is noted that the belt 18 may be a belt having an insulating layer formed on a surface of a metal belt as an example. By such driving rollers 20, the belt 18 is moved and moreover nanofibers can be gathered uniformly to the surface of the base sheet S on the belt 18.

The electrospinning head 14 and the collector 16 are placed in a housing 22 of the nanofiber manufacturing apparatus 10. The housing 22 is a rectangular parallelepiped-shaped box member, in which a first space 24 is defined on an upper side while a second space 26 is defined below the first space 24.

The first space 24 of the housing 22 is a electrospinning space in which nanofibers are formed from a raw material liquid, and the electrospinning head 14 and the collector 16 are placed in the electrospinning space 24. Hereinafter, the first space 24 will be referred to as a electrospinning space 24. In the second space 26, control equipment, power supply and the like for the nanofiber manufacturing apparatus 10 are placed. For example, motors or the like (not shown) for rotating the driving rollers 20 of the collector 16 are placed in the second space 26.

At least part of walls constituting the housing 22, more specifically, part of walls defining the electrospinning space 24 is formed into a double-walled structure. The double-wall part is composed of an inner wall 22a of the inner side (electrospinning space 24 side) formed of an insulating material, and an outer wall 22b of the outer side (outer side of the nanofiber manufacturing apparatus 10) formed of an electrical conductor. The outer wall 22b is grounded via a grounding wire (not shown) as an example. More specifically, the whole housing 22 is made up by the outer wall 22b (conductor), and the inner wall 22a (insulator) is provided as part of the internal surface of the outer wall 22b confronting the electrospinning space 24.

The insulating inner wall 22a is provided to suppress discharge to the housing 22 from the nozzles 12 of the electrospinning head 14 to which a high voltage is applied or from the collector 16 to which a high voltage is applied. On the other hand, the conducting outer wall 22b is provided to prevent electric shocks due to contact with the electrically charged insulating (dielectric) inner wall 22a during operation of the nanofiber manufacturing apparatus 10.

Figure 3:
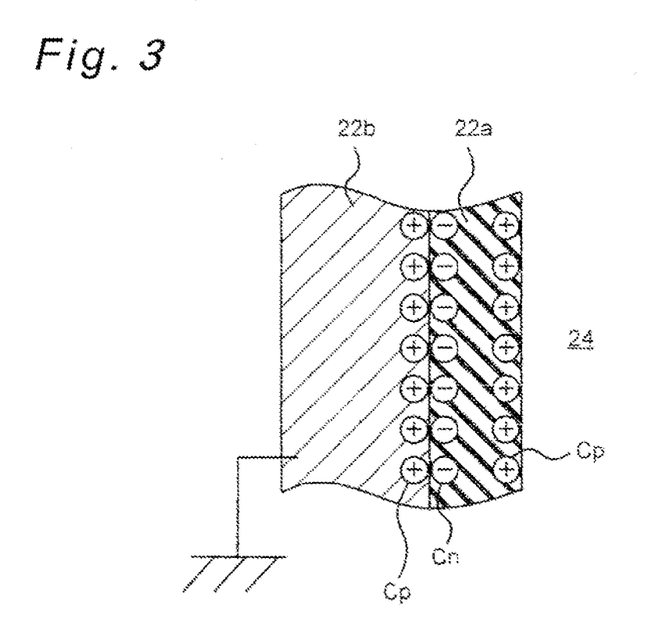
FIG. 3 is a view for explaining a wall of housing with double-walled structure that defines an electrospinning space of the nanofiber manufacturing apparatus.

More specifically, during operation of the nanofiber manufacturing apparatus 10, since high voltage is used in the electrospinning space 24, dielectric polarization occurs to the insulating inner wall 22a. For example, as shown in FIG. 3, positive electric charge Cp occurs on the electrospinning space 24 side of the inner wall 22a, while negative electric charge Cn occurs on its opposite side. Without the presence of the outer wall 22b, there would be a possibility that the operator is electrically shocked by the charge Cn occurring outside the inner wall 22a. As a countermeasure against this, the grounded conducting outer wall 22b is provided outside the insulating inner wall 22a.

A part 28 of the walls of the housing 22 (corresponding to "support structure" in appended Claims), which is formed fittable and removable, serves to support the electrospinning head 14, as will be detailed later. In this embodiment, specifically, the support structure 28 is one side wall of the rectangular parallelepiped-shaped housing 22, where its upper portion defines the electrospinning space 24 while its lower portion defines the second space 26. Accordingly, as shown in FIG. 4, the upper portion of the support structure 28 that defines the electrospinning space 24 is formed into a double-walled structure of the inner wall 22a and the outer wall 22b.

In addition, FIG. 2 shows the nanofiber manufacturing apparatus 10 with the support structure 28 removed therefrom. In FIG. 2, there can be seen a seal member 30 for sealing between the support structure 28 and a main body 25 of the housing 22. This seal member 30 prevents nanofibers from leaking outside the housing 22. The seal member 30, although being fitted to the main body 25 of the housing 22 in the figure, yet may also be fitted to the support structure 28. Further, although not shown, as a means for removably fixing the support structure 28 to the main body 25 of the housing 22, for example, a buckle is provided in the nanofiber manufacturing apparatus 10.

The support structure 28 has, in its lower portion, a carriage part 34 equipped with a plurality of casters 32a, 32b which roll on a floor surface. Therefore, the support structure 28, as shown in FIG. 4, is enabled to self-stand and run in a state of being removed from the nanofiber manufacturing apparatus 10. The carriage part 34 may also be provided so as to be fittable and removable to the support structure 28 that supports the electrospinning head 14. That is, it may be arranged that the support structure 28 removably fitted to the housing 22 is received by the carriage part 34 and then the support structure 28 is transported by the carriage part 34 so that maintenance of the electrospinning head 14 of the support structure 28 can be fulfilled. The support structure 28 may also be provided in such a specific form as a door, a window or the like and its size has only to be capable of supporting at least working heads such as the electrospinning head 14 (working heads other than the electrospinning head 14 will be described later)

Figure 4:
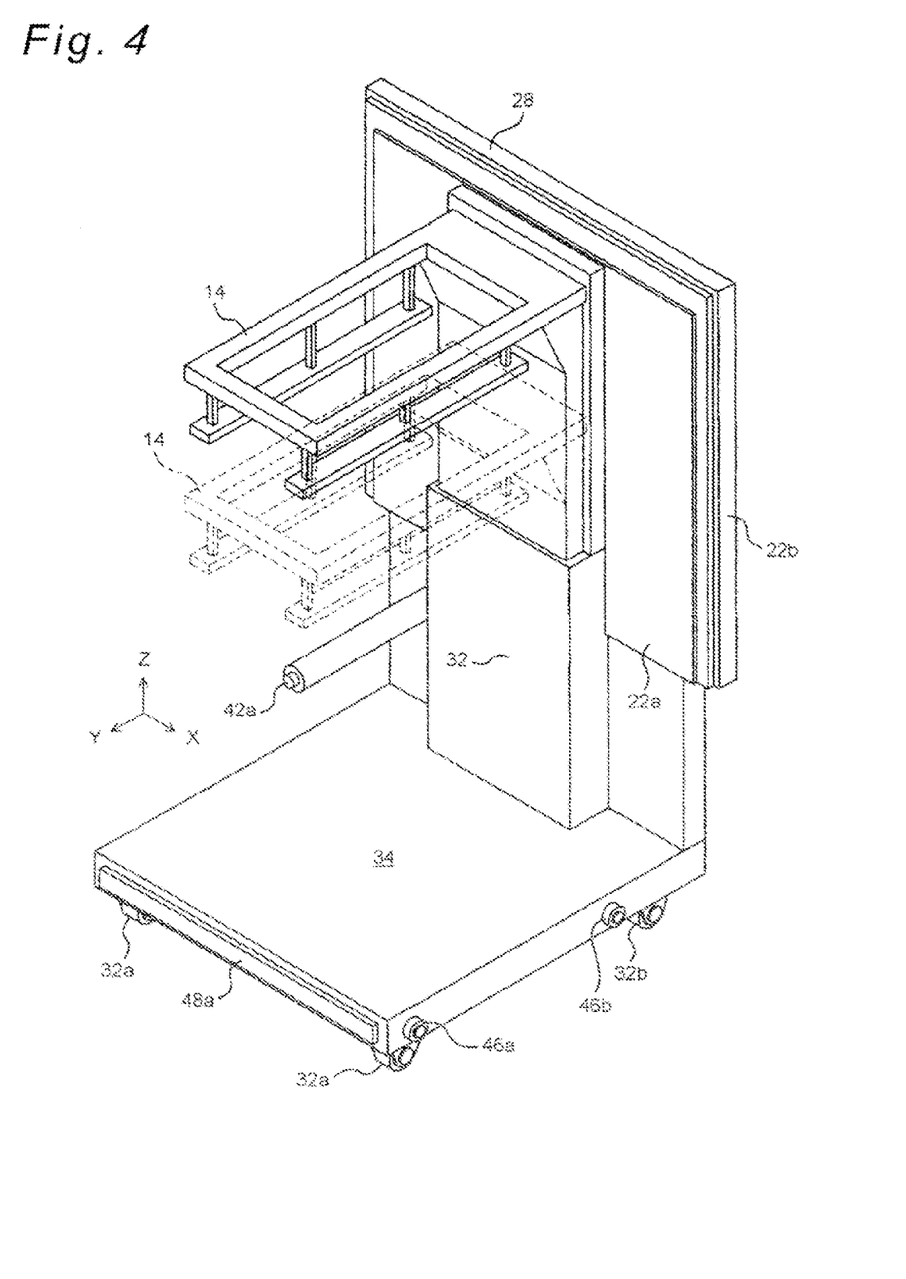
FIG. 4 is a perspective view of the support structure.

As shown in FIGS. 1 and 4, the support structure 28 supports the electrospinning head 14. More specifically, the support structure 28 is provided with a head up/down mechanism (head moving mechanism) 36 for moving up and down (moving in the Z-axis direction) the electrospinning head 14. This head up/down mechanism 36 supports the electrospinning head 14 in a cantilever state. The electrospinning head 14 is moved up and down by the head up/down mechanism 36 as shown in FIG. 4 so that a distance between the nozzles 12 and the collector 16 is adjusted. In addition, the head up/down mechanism 36 may be constituted so as to be fed with electric power to move up and down the electrospinning head 14, or may be a mechanism designed to move up and down the electrospinning head 14 by human power. Furthermore, the head up/down mechanism 36 may be replaced with a head moving mechanism for moving the electrospinning head 14 in a vertical direction (Z-axis direction) and horizontal directions (X- and Y-axis directions).

Electrical equipment (head driving unit) related to the drive of the electrospinning head 14 (nozzles 12), such as a voltage control unit 38 for controlling the voltage applied to the nozzles 12, a tank and a pump (not shown) for feeding the raw material liquid to the nozzles 12, and a motor 40 for driving the head up/down mechanism 36 is provided not on the main body 25 of the housing 22 but on the support structure 28. It is noted that the term 'electrical equipment' herein refers to equipment that operates under feed of electric power.

Also, the electrical equipment related to the electrospinning head 14 is entirely or partly fitted in an outer-side portion of the support structure 28 (a portion positioned outside the housing 22 when the support structure 28 is fitted to the main body 25 of the housing 22). Electrical equipment fitted on the outer-side portion of the support structure 28 is positioned outside the electrospinning space 24, and therefore prevented from deposition and contamination of nanofibers. Besides, there is a further advantage that maintenance of electrical equipment fitted in the outer-side portion of the support structure 28 can be fulfilled without removing the support structure 28.

Electrical equipment related to the electrospinning head 14 and provided in the support structure 28 operates under feed of electric power from the main body 25 of the nanofiber manufacturing apparatus 10. For this purpose, the nanofiber manufacturing apparatus 10 is provided with a power-feeding connector 42 being fittable and removable and serving for electrically connecting the support structure 28 with the main body 25 of the nanofiber manufacturing apparatus 10 to feed electric power.

When the support structure 28 is removed from the main body 25 of the housing 22, the power-feeding connector 42 releases the electrical connection between the support structure 28 and the main body 25 of the nanofiber manufacturing apparatus 10. For this purpose, the power-feeding connector 42 has a terminal (corresponding to "support structure-side power feeding terminal" in appended Claims) 42a provided in the support structure 28, and a terminal (corresponding to "housing-side power feeding terminal" in appended Claims) 42b provided in the main body 25 of the nanofiber manufacturing apparatus 10 (main body 25 of the housing 22). The terminal 42a on the support structure 28 side is electrically connected to electrical equipment related to the electrospinning head 14. The terminal 42b on the side of the main body 25 of the nanofiber manufacturing apparatus 10 is electrically connected to the power supply. These terminals 42a, 42b are so arranged as to be electrically connected to each other by mutual contact in fitting-and-removal direction of the support structure 28 (in the Y-axis direction).

For example as shown in FIG. 4, the terminal 42a on the support structure 28 side is provided at a forward end of a cylindrical-shaped rod extending in the Y-axis direction. On the other hand, the terminal 42b on the side of the main body 25 of the nanofiber manufacturing apparatus 10 is provided at a bottom portion of a cylinder which is engageable with the rod and extends in the Y-axis direction. The terminals 42a, 42b of the power-feeding connector 42 may be provided in any form only if the terminals are contactable with each other in the Y-axis direction.

The nanofiber manufacturing apparatus 10 has a guide mechanism for guiding the support structure 28 in the Y-axis direction in its fitting/removal process so that the terminals 42a, 42b of the power-feeding connector 42 are securely brought into contact with each other in the Y-axis direction. More specifically, on side faces of the carriage part 34 of the support structure 28, a plurality of rollers 46a, 46b which trail on rails 44 extending in the Y-axis direction and provided in lower part of the main body 25 of the housing 22 of the nanofiber manufacturing apparatus 10 are fitted. The rails 44 of the main body 25 and the rollers 46a, 46b of the carriage part 34 function as a guide mechanism for restricting the fitting-and-removal direction of the support structure 28 to the Y direction. The rollers 46a, 46b of the carriage part 34 are guided onto upper surfaces 44b of the rails 44 by an guide surfaces 44a which are sloping surfaces provided on the forward end side (a fitting side of the support structure 28 to the main body 25) of the rails 44 of the main body 25. In addition, the guide mechanism is not limited to the rails 44 and the rollers 46a, 46b only if the mechanism can restrict the fitting-and-removal direction of the support structure 28 to the Y-axis direction. For example, the guide mechanism may be so constructed that cam followers provided on the main body 25 of the nanofiber manufacturing apparatus 10 trails along grooves formed on side faces of the carriage part 34 of the support structure 28 so as to extend in the Y-axis direction.

A height of the upper surfaces 44b of the rails 44, with which the rollers 46a, 46b are put into contact, from the floor surfaces (i.e., a Z-axis direction distance between contact surface and floor surface) is set to such a height that the casters 32a, 32b of the carriage part 34 of the support structure 28 become apart from the floor surface. This is to determine a Z-axis direction position of the support structure 28.

In this connection, the support structure 28 is so structured as to be prevented from tilting over toward outside of the housing 22 during fitting/removal process to the main body 25 of the housing 22. More specifically, the term "during fitting/removal process" herein refers, for the fitting process, to a period lasting from when the roller 46a on the fore side of the fitting direction comes into contact with the guide surface 44a of the rail 44 until when the roller 46b on the rear side of the fitting direction reaches onto the upper surface 44b of the rail 44. On the other hand, for the removal process, the term "during fitting/removal process" refers to a period lasting from when the roller 46b on the fore side of the removal direction has moved onto the guide surface 44a until when the roller 46a on the rear side of the removal direction becomes apart from the guide surface 44a.

Figure 5:
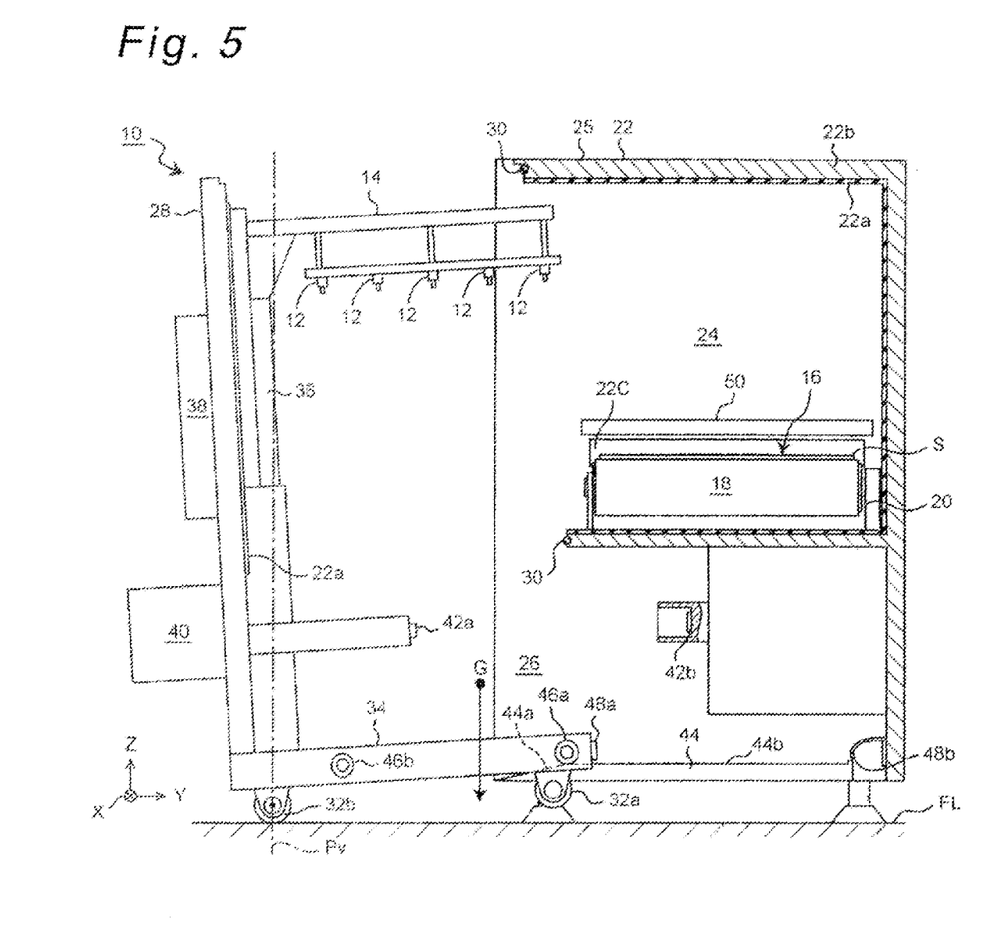
FIG. 5 is a view showing the support structure under a process of its fitting or removal to the housing.

More specifically, with regard to the support structure 28 as shown in FIG. 5, during fitting/removal process to the main body 25 of the housing 22, the caster 32a, which is closer to the main body 25 of the housing 22, goes apart from a floor surface FL while the caster 32b that is the farther one rolls on the floor surface FL. Therefore, the support structure 28 is so postured as to be inclined toward outward of the housing 22. This inclined posture is due to the positioning that the roller 46a, which is the closer to the main body 25 of the housing 22, is positioned on the upper surface 44b of the rail 44 while the roller 46b, which is the farther from the main body 25 of the housing 22, is not positioned on the upper surface 44b of the rail 44.

The support structure 28 is so constituted that the center of gravity G of the support structure 28 is positioned at least on the housing 22 side in the Y-axis direction (a direction in which the support structure 28 is fitted to and removed from the housing 22) with respect to a wall (inner wall 22a) of the support structure 28 in order that, in the posture inclined toward outside of the housing 22 as shown in FIG. 5, the support structure 28 is prevented from being further inclined, toward outside of the housing 22 and tilted over. More preferably, in the fitting of the support structure 28 to the main body 25 of the housing 22, the center of gravity G is positioned at a position which is inside the main body 25 of the housing 22 and which is near the floor surface FL (near the carriage part 34).

Further more specifically, for the support structure 28, preferably, its center of gravity G is positioned on the housing 22 side of a vertically extending imaginary plane Pv (parallel to an X-Z plane) containing a rotational center line of the caster 32b positioned on the drawing-out side of the support structure 28 in the Y-axis direction. As a result of this, tilt-over of the support structure 28 toward the caster 32b side can be suppressed not only during fitting/removal process of the support structure 28 to the main body 25 of the housing 22 but also during its running on the floor surface FL. The position of the center of gravity G of the support structure 28 is adjusted by designing the support structure 28 so that the center of gravity G is positioned on the housing 22 side during fitting/removal process to the main body 25 of the housing 22 or by resting a weight on the carriage part 34 as an example.

Figure 6:
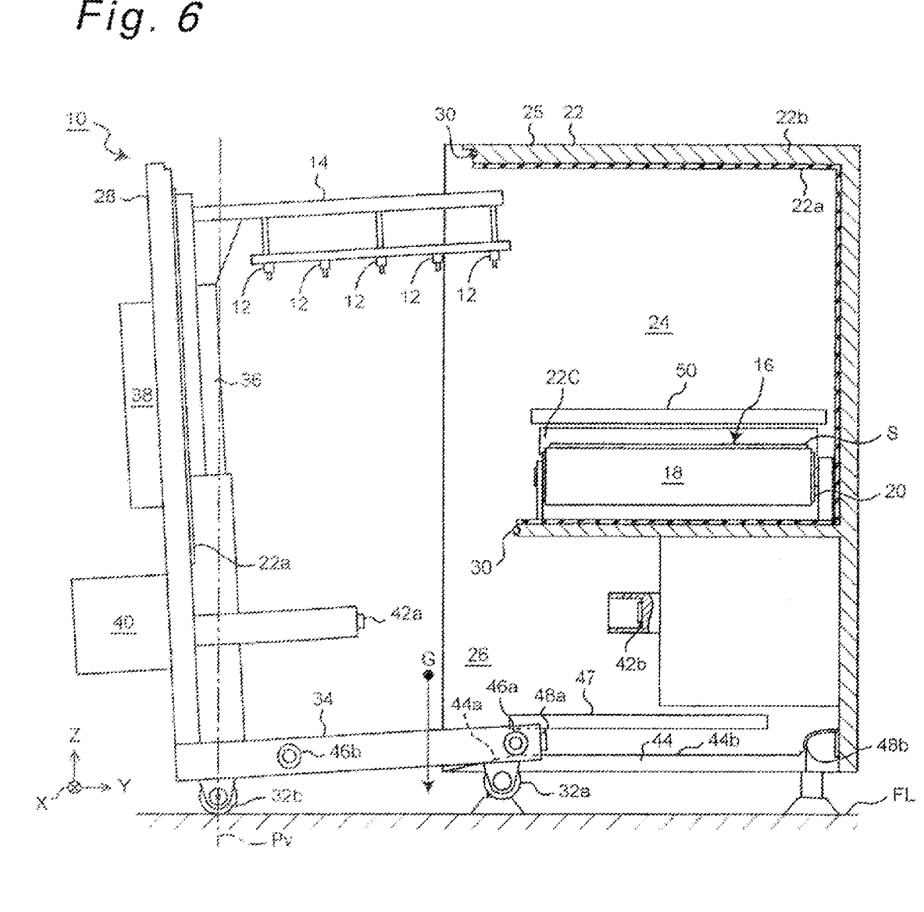
FIG. 6 is a view showing a support structure under fitting or removal to the housing in another embodiment.

In addition, as shown in FIG. 6, for more reliable suppression of tilt-over of the support structure 28 during fitting/removal process to the main body of the housing 22, it is also allowable to provide a tilt-over preventing member 47 placed above the rail 44 and extending parallel to the upper surface 44b of the rail 44. When the support structure 28 is tilted toward outside of the housing 22 (tilted to an extent further than the above-described tilted posture) during fitting/removal process of the support structure 28 to the main body 25 of the housing 22, the tilt-over preventing member 47 comes into contact with the roller 46a rolling on the upper surface 44b of the rail 44. The tilt-over preventing member 47 prevents the roller 46a from moving upward, so that tilt-over of the support structure 28 toward outside of the housing 22 can be prevented.

Further, the support structure 28 is so arranged as to be grounded via the main body of the nanofiber manufacturing apparatus 10 (main body 25 of the housing 22). For this purpose, the nanofiber manufacturing apparatus includes a grounding connector 48 for electrically connecting the support structure 28 with the main body 25 of the nanofiber manufacturing apparatus 10 in a connectable-and-disconnectable manner. This grounding connector 48 is provided so that the support structure 28 is removed from the main body of the nanofiber manufacturing apparatus 10 in a charge-eliminated state and moreover that a reference electric potential is given to electrical equipment related to the electrospinning head 14.

The grounding connector 48 is so arranged as to undo the electrical connection between the support structure 28 and the main body 25 of the nanofiber manufacturing apparatus 10 when the support structure 28 is removed from the main body 25 of the nanofiber manufacturing apparatus 10. For this purpose, the grounding connector 48 has a terminal (corresponding to "support structure-side grounding terminal" in appended Claims) 48a provided in the support structure 28 and a terminal (corresponding to "housing-side grounding terminal" in appended Claims) 48b provided in the main body 25 of the nanofiber manufacturing apparatus 10. The terminal 48a of the grounding connector 48 is electrically connected to the conducting outer wall 22b of the support structure 28 and electrical equipment related to the drive of the electrospinning head 14. The other terminal 48b is grounded via the grounding wire (not shown). These terminals 48a, 48b are so arranged as to be brought into contact with, and thereby electrically connected to, each other in the fitting-and-removal direction of the support structure 28 (in the Y-axis direction) like the terminals 42a, 42b of the power-feeding connector 42.

For example, the support structure 28 side terminal 48a of the grounding connector 48 is a plate-shaped single terminal provided at a front of the carriage part 34 and extending in the X-axis direction as shown in FIG. 4. On the other hand, the terminal 48b on the side of the main body 25 of the nanofiber manufacturing apparatus 101 is provided in plurality as shown in FIG. 2 and arrayed in the X-axis direction so as to be opposed to the support structure 28 side terminal 48a. By the arrangement that the terminals 48b on the side of the main body 25 of the nanofiber manufacturing apparatus 10 provided in plurality are arrayed in the X-axis direction, even if the support structure 28 is fitted to the main body 25 of the nanofiber manufacturing apparatus 10 with the fitting-and-removal direction inclined from the Y-axis direction toward the horizontal direction, at least one terminal 48b can be brought into contact with the support structure 28 side terminal 48a. As a result, the support structure 28 side terminal 48a is securely grounded.

Figure 7:
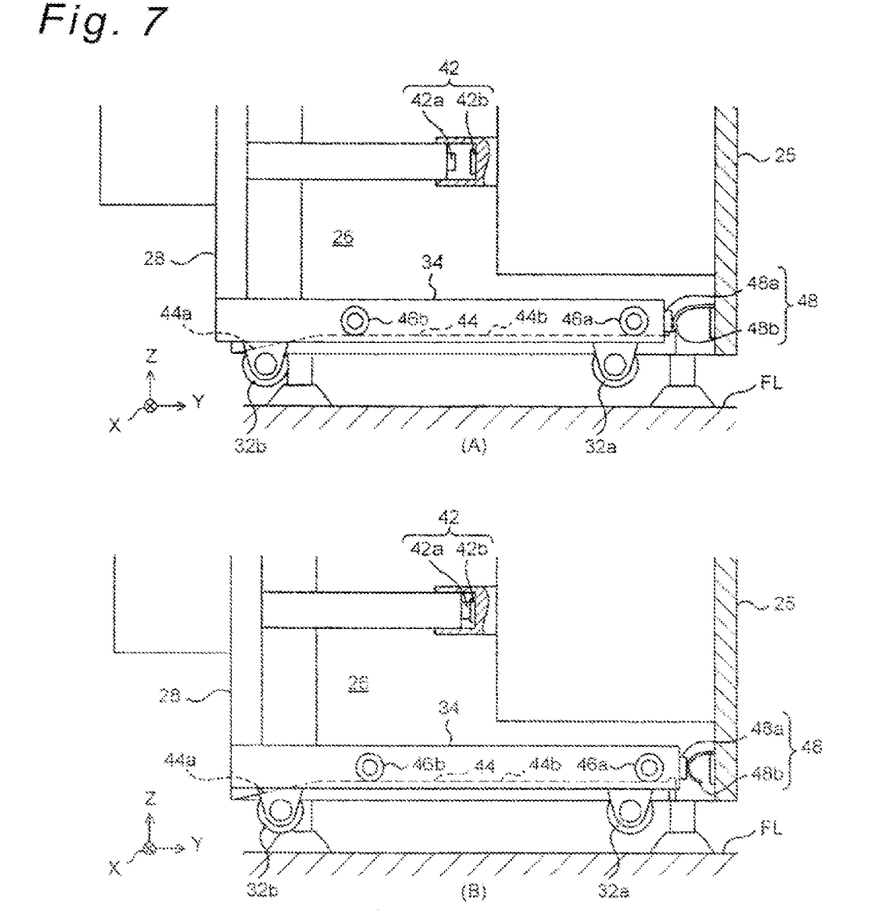
FIG. 7(A)-7(B) are a view for explaining a grounding connector.

Also, as shown in FIG. 1, each of the terminals 48b of the grounding connector 48 on the side of the main body 25 of the nanofiber manufacturing apparatus 10 is formed into a cantilever shape extending in the Y-axis direction, its free end coming into contact with the support structure 28 side terminal 48a. More concretely, as shown in FIG. 7(A), the terminals 48b on the side of the main body 25 of the nanofiber manufacturing apparatus 10 are designed to have such a length in the Y-axis direction as to come into contact with the support structure 28 side terminal 48a before the terminals 42a and 42b of the power-feeding connector 42 are brought into contact with each other.

Further, the or each terminal 48b on the side of the main body 25 of the nanofiber manufacturing apparatus 10, because of its cantilever shape extending in the Y-axis direction, is flexurally deformed when pressed by the support structure 28 side terminal 48a in the Y-axis direction. As a result of this, as shown in FIG. 7(B), the terminal 48b is enabled to maintain the contact with the terminal 48a even after the terminals 42a and 42b of the power feeding connector 42 are brought into contact with each other.

According to the terminal 48b on the side of the main body 25 of the nanofiber manufacturing apparatus 10 as described above, naturally, the contact between the terminal 48b and the support structure 28 side terminal 48a is released after the contact between the terminals 42a and 42b of the power feeding connector 42 is released.

Therefore, before a start of power feed from the main body 25 of the nanofiber manufacturing apparatus 10 to the support structure 28 via the power-feeding connector 42, the support structure 28 is grounded via the grounding connector 48. Also, after a stop of power feed from the main body of the nanofiber manufacturing apparatus 10 to the support structure 28 via the power feeding connector 42, the grounding of the support structure 28 via the grounding connector 48 is released. Thus, electric power is fed from the main body 25 of the nanofiber manufacturing apparatus 10 to the support structure 28 only while the support structure 28 is grounded. Further, the support structure 28 is removed, in a charge-eliminated state, from the main body 25 of the nanofiber manufacturing apparatus 10. As a result, maintenance of the nozzles 12 of the electrospinning head 14 can be fulfilled safely outside the housing 22.

In addition, the terminals of the grounding connector 48 are not limited to the above-described shape, and may be formed into any shape only if at least either the terminals on the side of the main body 25 of the nanofiber manufacturing apparatus 10 or the support structure 28 side terminal is expandable and contractible in the fitting-and-removal direction of the support structure 28 (in the Y-axis direction). As an example, the support structure 28 side terminal may be in a spring shape compressible in the fitting-and-removal direction.

According to the nanofiber manufacturing apparatus 10 as described above, maintenance of the nozzles 12, e.g. cleaning or replacement of the nozzles 12, can be carried out as shown below.

For maintenance of the nozzles 12, first, the power of the nanofiber manufacturing apparatus 10 is turned off so that power feed from the main body 25 of the nanofiber manufacturing apparatus 10 to the support structure 28 via the power-feeding connector 42 is stopped. In this operation, static charge is eliminated from the support structure 28 via the grounding connector 48.

Next, the charge-eliminated support structure 28 is removed from the main body 25 of the nanofiber manufacturing apparatus 10 in the Y-axis direction. The support structure 28, after completely removed from the main body 25 of the nanofiber manufacturing apparatus 10, is moved to a desired maintenance position (e.g., a wide space that allows maintenance work to be carried out) via the casters 32 of the carriage part 34. Then, the maintenance of the nozzles 12 is fulfilled safely.

According to this embodiment, the support structure 28 supporting the electrospinning head 14 equipped with the nozzles 12 is removed from the main body 25 of the housing 22 of the nanofiber manufacturing apparatus 10, so that maintenance of the nozzles 12 can be fulfilled outside the electrospinning space 24. Thus, workability and safety of the maintenance are higher than when it is fulfilled within the electrospinning space 24. Also, since the support structure 28 is enabled to self-stand, maintenance of the nozzles 12 can be started immediately after the removal of the support structure 28 from the main body 25 of the housing 22. In addition, the state of removal of the support structure 28 from the main body 25 of the housing 22 includes not only a completely-separated state that the support structure 28 has been completely removed, but also a partly-separated state that the support structure 28 is partly coupled to the main body 25 while enough space for maintenance is ensured.

The present invention has been fully described hereinabove. However, the invention is not limited to the contents of the above description.

For example, the support structure 28 may be provided so as to be capable of manufacturing nanofibers in a single unit. More specifically, the support structure 28 may be provided as an electrospinning head unit including at least: an electrospinning head 14 having nozzles 12 for ejecting a raw material liquid into an electrospinning space 24; a raw material liquid feeding unit (valve and pump) for feeding a raw material liquid to the nozzles 12; and a power supply for applying a voltage to the nozzles 12. By such a support structure (electrospinning head unit) 28, nanofibers can be fabricated within the housing 22 even if no power supply for applying a voltage to the nozzles 12 of the electrospinning head 14 is provided on the side of the main body 25 of the housing 22.

For example, in some cases, a plurality of single-unit nanofiber manufacturing apparatuses 10 are arrayed in the X-axis direction so as to be enabled to function as part of a nanofiber sheet manufacturing line.

In more detail, in the nanofiber manufacturing apparatus 10, as shown in FIG. 2, the housing 22 has an opening 22c serving as an inlet/outlet for base sheets S to the housing 22 so that the elongate base sheet S is allowed to pass along the X-axis direction within the electrospinning space 24. The elongate base sheet S is conveyed on the belt 18 of the collector 16 in each of the plural nanofiber manufacturing apparatuses 10, so that the base sheet S can be passed along within the electrospinning space 24 in each of the plural nanofiber manufacturing apparatuses 10. In addition, a suction duct 50 for sucking up nanofibers scattered near a front (the electrospinning space 24 side) of the opening 22c is provided above the opening 22c so that nanofibers are prevented from scattering outward of the nanofiber manufacturing apparatus 10 via the opening 22c.

With such a constitution as described above, it becomes implementable, for example, to form a first nanofiber layer on the base sheet S by a first nanofiber manufacturing apparatus 10 located most upstream with respect to the moving direction of the base sheet S (X-axis direction) and to form a second nanofiber layer on the first nanofiber layer by a succeeding-stage second nanofiber manufacturing apparatus 10.

In addition, on the upstream side of the most-upstream nanofiber manufacturing apparatus 10 with respect to the moving direction of the base sheet S, for example, a base sheet feeding unit for feeding the base sheet S in a downstream direction, a unit for applying adhesive onto the base sheet S (for cases where nanofiber is adhesively fixed to the base sheet S with adhesive), and the like are placed. Also, on the downstream side of the most-downstream nanofiber manufacturing apparatus 10 with respect to the moving direction of the base sheet S, for example, a base sheet recovering unit for recovering the base sheet S on which nanofiber layers have been formed, a thermal press-bonding unit for thermally press-bonding nanofiber onto the base sheet S (for cases where nanofiber on the sheet S is thermally press-bonded and thereby fixed to the base sheet S), and the like are placed.

Furthermore, for example, a head up/down mechanism 36 of the support structure 28 may be provided so as to removably support the electrospinning head 14 having a plurality of nozzles 12. As a result, by replacement with a maintenance-fulfilled or new-product electrospinning head 14, it becomes possible to reduce the stop time of the nanofiber manufacturing apparatus 10 due to its maintenance, compared with the case where the plurality of nozzles 12 of the electrospinning head 14 are subjected to maintenance one by one.

In this connection, the support structure 28 (head up/down mechanism 36) may be so constituted as to be able to support a working head for executing work related to the fabrication of nanofibers, such as an adhesive application head for applying adhesive for fixation of nanofiber onto the base sheet S or a thermal press-bonding head for thermally press-bonding, to a base sheet S, nanofiber placed on the base sheet S, instead of the nozzle head 14. In this case, with use of a plurality of nanofiber manufacturing apparatuses 10 of a common-module structure having a support structure 28 for working heads that perform at least different working processes, it becomes implementable, for example, to realize a production line for executing a step of applying adhesive to the base sheet S by an adhesive application head, a step of fabricating nanofiber by the electrospinning head 14 and accumulating the nanofiber on the base sheet S to which the adhesive has been applied, and a step of thermally press-bonding (thermally curing the adhesive), onto the base sheet S, the nanofibers accumulated on the base sheet S by the thermal press-bonding head. That is, it becomes unnecessary to separately provide an exclusive unit for applying adhesive to the base sheet S or an exclusive unit for thermally press-bonding nanofiber to the base sheet S. In addition, working heads such as an adhesive application head and a thermal press-bonding head can be subjected to maintenance outside the housing 22 under a condition that the support structure 28 having the working heads are removed from the main body 25 of the nanofiber manufacturing apparatus 10, like the electrospinning head 14.

In the above-described embodiment, the electrospinning head 14, which is a working head, is supported by the support structure 28 via the head up/down mechanism 36. However, for example, in cases where the electrospinning head 14 does not need to be moved vertically within the housing 22, the electrospinning head 14 may be fixed directly to the support structure 28.

Also in the above-described embodiment, as shown in FIGS. 1 and 4, the support structure 28 stands by itself in a state of having been removed from the main body 25 of the nanofiber manufacturing apparatus 10 by the lower carriage part 34. However, the invention is not limited to this. For example, a carriage may be provided separately, in which case the carriage is united with the support structure (a support structure having no carriage part) 28 in the state of being fitted to the main body 25 of the nanofiber manufacturing apparatus 10 and moreover the support structure 28 united with the carriage, when removed from the main body 25 of the apparatus 10, stands by self. The invention is not limited to cases where the means that allows the support structure 28 to self-stand in the state of being removed from the main body 25 of the nanofiber manufacturing apparatus 10 is provided integrally with the support structure 28.

Moreover, in the above-described embodiment, as shown in FIGS. 1 and 4, the support structure 28 is enabled to run by the carriage part 34, but the invention is not limited to that. The support structure 28 has only to be capable of at least self-standing in the state of having been removed from the main body 25 of the nanofiber manufacturing apparatus 10.

Also in the above-described embodiment, as shown in FIG. 4, part of the wall of the housing 22 that defines the electrospinning space 24, in which high voltage is used, is in a double-walled structure composed of the insulating inner wall 22a and the conducting outer wall 22b. However, it is also allowable that the inner wall 22a and the outer wall 22b are provided as separable from each other. That is, the inner wall 22a may be formed fittable to and removable from the outer wall 22b.

In more detail, the insulating inner wall 22a and the conducting outer wall 22b have only to be at least in electrical contact with each other at least when high voltage is used in the electrospinning space 24 and when charge amounts remain due to use of high voltage. This is because dielectric polarization of the insulating inner wall 22a occurs primarily during the fabrication of nanofibers.

By the arrangement that the inner wall 22a is fittable to and removable from the outer wall 22b, it becomes implementable, for example, to clean the inner wall 22a, on which nanofibers are deposited, outside the electrospinning space 24. Further, in the above-described embodiment, as shown in FIG. 4, when the support structure 28 is removed, both the outer wall 22b and the inner wall 22a are removed from the main body 25 of the nanofiber manufacturing apparatus 10. However, it is also allowable that only the outer wall 22b is removed while the inner wall 22a is left in the main body 25 of the apparatus 10.

Furthermore, by the support structure 28 supporting the electrospinning head 14, there can be obtained an effect that maintenance of the nozzles 12 of the electrospinning head 14 can be carried out outside the nanofiber manufacturing apparatus 10, and moreover subordinate effects can also be obtained. That is, when the support structure 28 is removed from the main body 25 of the nanofiber manufacturing apparatus 10, the electrospinning head 14 is moved outward from within the electrospinning space 24, so that a large space is generated above the collector 16 as shown in FIG. 2. This space facilitates the maintenance of the electrospinning space 24, e.g. the collector 16. Also, since the electrospinning head 14 (nozzles 12) is absent in the electrospinning space 24, there is a further effect that the operator can be prevented from being stained by raw material liquid dripped from the nozzles 12.

Furthermore, in the above-described embodiment, the support structure 28 forms one side face (side wall) of the rectangular parallelepiped-shaped housing 22 as shown in FIG. 1. However, the invention is not limited to this. For example, the support structure 28 may form a portion of one side wall of the housing or form a plurality of side walls, or otherwise, may form the ceiling wall (or a portion thereof).

Furthermore, in the above-described embodiment, the support structure 28, which is one side face of the housing 22 defining the electrospinning space 24, is fittable to and removable from the housing 22. However, the invention is not limited to this. For example, in another embodiment, the nanofiber manufacturing apparatus has an inner housing for defining a electrospinning space, and an outer housing for housing the inner housing therein. The support structure, when fitted to the outer housing, isolates internal space and outside of the outer housing from each other. Also, the inner housing has an opening which, with the support structure fitted to the outer housing, allows the electrospinning head to pass through so that the electrospinning head supported by the support structure is placed within the electrospinning space. In such another embodiment, there is an advantage that nanofibers fabricated within the electrospinning space is less likely to be deposited on the support structure.

In short, the support structure according to the invention is not limited to cases where it is made fittable to and removable from the housing that defines the electrospinning space. In a broad sense, the support structure has only to be fittable to and removable from a housing internally having a electrospinning space.

Furthermore, the support structure 28 of the above-described embodiment has not only the function of supporting the electrospinning head 14, but also a function of isolating the electrospinning space 24 and the outside from each other. However, the invention is not limited to this. For example, in another embodiment, the support structure may be hermetically housed in the housing of the nanofiber manufacturing apparatus. In this case, the support structure does not need to isolate the electrospinning space and the outside from each other.

In short, the support structure according to the invention, in a broad sense, has only to be fittable to and removable from the housing of the nanofiber manufacturing apparatus, to allow the electrospinning head to be placed within the electrospinning space, and to self-stand in the state of having been removed from the housing.

Finally, in the above-described embodiment, the support structure 28 is directly fittable to and removable from the housing 22 (main body 25). However, the support structure 28 may be made fittable to and removable from a member fitted to the housing 22 (main body 25). That is, the support structure 28 may also be indirectly fittable to and removable from the housing 22 (main body 25).

Although the present invention has been fully described in connection with the preferred embodiments thereof with reference to the accompanying drawings, it is to be noted that various changes and modifications are apparent to those skilled in the art. Such Changes and modifications are to be understood as included within the scope of the present invention as defined by the appended claims unless they depart therefrom.

The entire disclosures of Japanese Patent Application No. 2010-202482 filed on Sep. 9, 2010, and its priority claim application, Japanese Patent Application No. 2011-17017 filed on Jan. 28, 2011, each including specification, claims, drawings, and summary are incorporated herein by reference in its entirety.

INDUSTRIAL APPLICABILITY

The present invention is applicable even to apparatuses and methods different from those of the above-described embodiment, in which nanofibers are accumulated directly on the collector as an example, only if the apparatus or the method is to fabricate nanofibers from polymer solution by electrostatic explosions in the housing.

The invention claimed is:

1. A support structure for supporting an electrospinning head including a plurality of arrayed nozzles for ejecting a raw material liquid into an electrospinning space in which nanofibers are fabricated, by a cantilever supporting fashion using one end of the electrospinning head in a longitudinal direction of the nozzle array, wherein
the support structure is fittable to and removable from a housing internally having the electrospinning space and is enabled to self-stand in a state of having been removed from the housing in the longitudinal direction of the nozzle array so that at least part of the electrospinning head has been taken out of the electrospinning space.

2. The support structure according to claim 1, further comprising a head moving mechanism for adjusting a distance between a collector and the electrospinning head, the collector being placed within the electrospinning space to collect nanofibers.

3. The support structure according to claim 1, wherein the support structure, while fitted to the housing, isolates the electrospinning space and its outside from each other.

4. The support structure according to claim 1, wherein during fitting and removal of the support structure to the housing, a center of gravity of the support structure is positioned on one side closer to the housing.

5. The support structure according to claim 1, wherein the electrospinning head is made fittable to and removable from the support structure.

6. A nanofiber manufacturing apparatus for fabricating nanofibers from a raw material liquid by electrostatic explosions, the nanofiber manufacturing apparatus comprising:
a housing internally having an electrospinning space in which nanofibers are fabricated; and
a support structure for supporting an electrospinning head including a plurality of arrayed nozzles for ejecting the raw material liquid into the electrospinning space, by a cantilever supporting fashion using one end of the electrospinning head in a longitudinal direction of the nozzle array, wherein
the support structure is fittable to and removable from the housing and is enabled to self-stand while removed from the housing in the longitudinal direction of the nozzle array so that at least part of the electrospinning head is taken out of the electrospinning space.

7. The nanofiber manufacturing apparatus according to claim 6, wherein the support structure includes a head moving mechanism for adjusting a distance between a collector and the electrospinning head, the collector being placed within the electrospinning space to collect nanofibers.

8. The nanofiber manufacturing apparatus according to claim 6, wherein the housing includes a housing-side power feeding terminal connected to a power supply, and a grounded housing-side grounding terminal,
the support structure includes a head driving unit for driving the electrospinning head, a support structure-side power feeding terminal contactable with the housing-side power feeding terminal for feed of electric power to the head driving unit, and a support structure-side grounding terminal contactable with the housing-side grounding terminal for grounding of the support structure,
while the support structure is fitted to the housing, the housing-side power feeding terminal and the support structure-side power feeding terminal are in contact with each other and moreover the housing-side grounding terminal and the support structure-side grounding terminal are in contact with each other, and wherein
while the support structure has been removed from the housing, the housing-side power feeding terminal and the support structure-side power feeding terminal are disconnected from each other and moreover the housing-side grounding terminal and the support structure-side grounding terminal are disconnected from each other.

9. The nanofiber manufacturing apparatus according to claim 8, wherein the support structure serves as part of a wall of the housing defining the electrospinning space,
the wall of the housing defining the electrospinning space is made from a conductor and moreover an insulating layer is formed inside the wall, and
the support structure-side grounding terminal is connected to a conductor portion of the support structure.

10. The nanofiber manufacturing apparatus according to claim 8, wherein at least one of the housing-side grounding terminal and the support structure-side grounding terminal is made expandable and contractible with respect to a fitting-and-removal direction of the support structure so that for fitting of the support structure to the housing, the housing-side grounding terminal and the support structure-side grounding terminal are brought into contact with each other before the housing-side power feeding terminal and the support structure-side power feeding terminal are brought into contact with each other, and that for removal of the support structure from the housing, the housing-side grounding terminal and the support structure-side grounding terminal are released from their contact after the housing-side power feeding terminal and the support structure-side power feeding terminal are released from their contact.

11. The nanofiber manufacturing apparatus according to claim 8, wherein the head driving unit is fitted to a portion of the support structure which is positioned outside the housing while the support structure has been fitted to the housing.

12. The nanofiber manufacturing apparatus according to claim 6, further comprising a guide mechanism for guiding the support structure during fitting and removal of the support structure while restricting the fitting-and-removal direction of the support structure to a certain direction.

13. A nanofiber manufacturing apparatus for fabricating nanofibers from a raw material liquid by electrostatic explosions, the nanofiber manufacturing apparatus comprising:
a housing internally having an electrospinning space in which nanofibers are fabricated;
a collector placed within the electrospinning space to collect nanofibers; and
a support structure for cantilever-supporting a working head that performs work related to fabrication of nanofibers within the electrospinning space, wherein
the support structure is fittable to and removable from the housing and is enabled to self-stand while removed from the housing so that at least part of the working head is taken out of the electrospinning space.

14. The nanofiber manufacturing apparatus according to claim 13, wherein the support structure includes a head moving mechanism for adjusting a distance between the collector and the working head.

15. The nanofiber manufacturing apparatus according to claim 13, wherein the working head is fittable to and removable from the support structure, and
as the working head, any one of an electrospinning head including a nozzle for ejecting the raw material liquid into the electrospinning space, an adhesive application head for applying adhesive to a sheet on the collector, and a thermal press-bonding head for thermally press-bonding a sheet on the collector and nanofibers on the sheet to each other is fitted to the support structure.

16. The nanofiber manufacturing apparatus according to claim 13, wherein the housing includes a housing-side power feeding terminal connected to a power supply, and a grounded housing-side grounding terminal,
the support structure includes a head driving unit for driving the working head, a support structure-side power feeding terminal contactable with the housing-side power feeding terminal for feed of electric power to the head driving unit, and a support structure-side grounding terminal contactable with the housing-side grounding terminal for grounding of the support structure,
while the support structure has been fitted to the housing, the housing-side power feeding terminal and the support structure-side power feeding terminal are in contact with each other and moreover the housing-side grounding terminal and the support structure-side grounding terminal are in contact with each other, and
while the support structure has been removed from the housing, the housing-side power feeding terminal and the support structure-side power feeding terminal are disconnected from each other and moreover the housing-side grounding terminal and the support structure-side grounding terminal are disconnected from each other.

17. A nanofiber manufacturing method with use of a support structure for supporting an electrospinning head including a plurality of arrayed nozzles for ejecting a raw material liquid into an electrospinning space in which nanofibers are fabricated, by a cantilever supporting fashion using one end of the electrospinning head in a longitudinal direction of the nozzle array, comprising:
fitting the support structure to a housing internally having the electrospinning space so that the electrospinning head is placed in the electrospinning space;
fabricating nanofiber by electrostatic explosions from the raw material liquid ejected from the nozzles of the electrospinning head; and
removing the support structure from the housing in the longitudinal direction of the nozzle array after fabrication of nanofiber so that at least part of the electrospinning head is taken out of the electrospinning space.

* * * * *